United States Patent
Maresh et al.

(10) Patent No.: US 10,893,041 B2
(45) Date of Patent: Jan. 12, 2021

(54) SINGLE USE PASSCODE AUTHENTICATION

(71) Applicant: International Business Machines Corporation, Armonk, NY (US)

(72) Inventors: Mark Maresh, Wake, NC (US); Colm Nolan, Navan (IE); Juan F. Vargas, Cary, NC (US); Michael J. Whitney, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 241 days.

(21) Appl. No.: 16/156,117

(22) Filed: Oct. 10, 2018

(65) Prior Publication Data
US 2020/0120086 A1 Apr. 16, 2020

(51) Int. Cl.
*H04L 29/06* (2006.01)
(52) U.S. Cl.
CPC .......... *H04L 63/0838* (2013.01); *H04L 63/10* (2013.01)
(58) Field of Classification Search
CPC ...... H04L 63/0838; H04L 63/10; H04L 67/10
See application file for complete search history.

(56) References Cited

U.S. PATENT DOCUMENTS

| | | | |
|---|---|---|---|
| 5,724,423 | A | 3/1998 | Khello |
| 5,949,348 | A | 9/1999 | Kapp et al. |
| 6,434,702 | B1 | 8/2002 | Maddalozzo, Jr. et al. |
| 8,041,035 | B2 | 10/2011 | Miller |
| 8,453,207 | B1 * | 5/2013 | White .............. G06F 21/36 726/2 |
| 8,613,065 | B2 | 12/2013 | Hird et al. |
| 8,635,159 | B1 | 1/2014 | Cobb et al. |
| 8,819,428 | B2 | 8/2014 | Baig |
| 8,843,757 | B2 | 9/2014 | Varadarajan |

(Continued)

OTHER PUBLICATIONS

Authors et al.: Disclosed Anonymously, "System & Method for ATM to Authenticate & Authorize Mobile Application," An IP.com Prior Art Database Technical Disclosure, IP.com No. IPCOM000244875D, Jan. 25, 2016, 6 pgs.

(Continued)

*Primary Examiner* — Mahfuzur Rahman
(74) *Attorney, Agent, or Firm* — Cantor Colburn LLP; Tihon Poltavets

(57) ABSTRACT

According to aspects of the present disclosure, a computer-implemented method includes generating, by a host processing system, a single use authentication map to map a private set of characters to a public set of characters. The method further includes transmitting, by the host processing system, the single use authentication map to a user processing system that presents an authentication interface comprising the public set of characters to enable a user to enter a user passcode using the public set of characters. The user processing system encodes the user passcode into a single use passcode using the single use authentication map. The method further includes the host processing system receiving the single use passcode from the user processing system, decoding the single use passcode back the user passcode using the single use authentication map, and determining whether the user passcode matches an expected passcode.

18 Claims, 10 Drawing Sheets

(56) References Cited

U.S. PATENT DOCUMENTS

| | | | |
|---|---|---|---|
| 8,959,359 B2* | 2/2015 | White | G06F 21/36 |
| | | | 713/186 |
| 9,262,615 B2* | 2/2016 | Beloncik | G06F 21/32 |
| 9,552,465 B2* | 1/2017 | Pike | G07F 7/1041 |
| 10,229,399 B2* | 3/2019 | Urban | G06F 21/31 |
| 10,284,549 B2* | 5/2019 | Ganesan | H04L 63/0838 |
| 10,341,336 B2* | 7/2019 | An | H04L 9/3228 |
| 2004/0230843 A1 | 11/2004 | Jansen | |
| 2006/0206919 A1 | 9/2006 | Montgomery et al. | |
| 2010/0005515 A1 | 1/2010 | Votaw et al. | |
| 2010/0242104 A1* | 9/2010 | Wankmueller | G06F 21/36 |
| | | | 726/9 |
| 2012/0323788 A1 | 12/2012 | Keresman, III et al. | |
| 2015/0154414 A1* | 6/2015 | Pike | G06F 21/36 |
| | | | 726/30 |
| 2016/0162889 A1 | 6/2016 | Badenhorst | |

OTHER PUBLICATIONS

Authors et. al.: Disclosed Anonymously, "A Method for Increasing Security of Keypad Authentication through Randomization of Keys," An IP.com Prior Art Database Technical Disclosure, IP.com No. IPCOM000246109D, May 8, 2016, 4 pgs.

Bianchi et al., "The Secure Haptic Keypad: A Tactile Password System," CHI 2010: Input, Security, and Privacy Policies, Apr. 10-15, 2010, 4 pgs.

* cited by examiner

601

| Private → Public |
|---|
| 0 → 8 |
| 1 → 1 |
| 2 → 7 |
| 3 → 5 |
| 4 → 6 |
| 5 → 4 |
| 6 → 2 |
| 7 → 9 |
| 8 → 3 |
| 9 → 0 |

| Private → Public |
|---|
| 4 → 0 |
| 9 → 1 |
| 7 → 2 |
| 5 → 3 |
| 0 → 4 |
| 8 → 5 |
| 3 → 6 |
| 2 → 7 |
| 6 → 8 |
| 1 → 9 |

| Private → Public |
|---|
| D → 0 |
| A → 1 |
| F → 2 |
| C → 3 |
| B → 4 |
| E → 5 |
| H → 6 |
| G → 7 |

| Private → Public |
|---|
| A → F |
| B → B |
| C → D |
| D → A |
| E → H |
| F → J |
| G → C |
| H → I |
| I → E |
| J → G |

FIG. 6D

SINGLE USE PASSCODE AUTHENTICATION

BACKGROUND

The present invention generally relates to processing systems, and more specifically, to a single use passcode authentication.

Processing systems can be used to access secure or protected data. In order to access the secure or protected data, a user may be required to authenticate itself in order to be granted access. For example, the user enters a username and password to gain access to a secure portion of a website. Basic username and password authentication is common and easy to implement but can also be less secure than other authentication techniques. Some websites, applications, data stores, etc., implement more advanced authentication techniques. For example, a financial institution, an online medical chart, can require multiple levels of authentication (i.e., multi-factor authentication) for a user to access secure or protected data. Multi-factor authentication requires that a user present multiple separate pieces of evidence to gain access to secure or protected data.

SUMMARY

Embodiments of the present invention are directed to a computer-implemented method for single use passcode authentication. A non-limiting example of the computer-implemented method includes generating, by a host processing system, a single use authentication map to map a private set of characters to a public set of characters. The method further includes transmitting, by the host processing system, the single use authentication map to a user processing system, the user processing system presenting an authentication interface that includes the public set of characters to a user to enable the user to enter a user passcode using the public set of characters, the user processing system encoding the user passcode into a single use passcode based at least in part on the single use authentication map. The method further includes receiving, by the host processing system, the single use passcode from the user processing system. The method further includes decoding, by the host processing system, the single use passcode back the user passcode based at least in part on the single use authentication map. The method further includes determining, by the host processing system, whether the user passcode matches an expected passcode.

Embodiments of the present invention are directed to a system. A non-limiting example of the system includes a memory comprising computer readable instructions and a processing device for executing the computer readable instructions for performing a method for single use passcode authentication.

Embodiments of the invention are directed to a computer program product. A non-limiting example of the computer program product includes a computer readable storage medium having program instructions embodied therewith. The program instructions are executable by a processor to cause the processor to perform a method for single use passcode authentication.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIGS. 6A, 6B, 6C, and 6D depict various examples of single use authentication maps according to one or more embodiments described herein;

Figure 1:
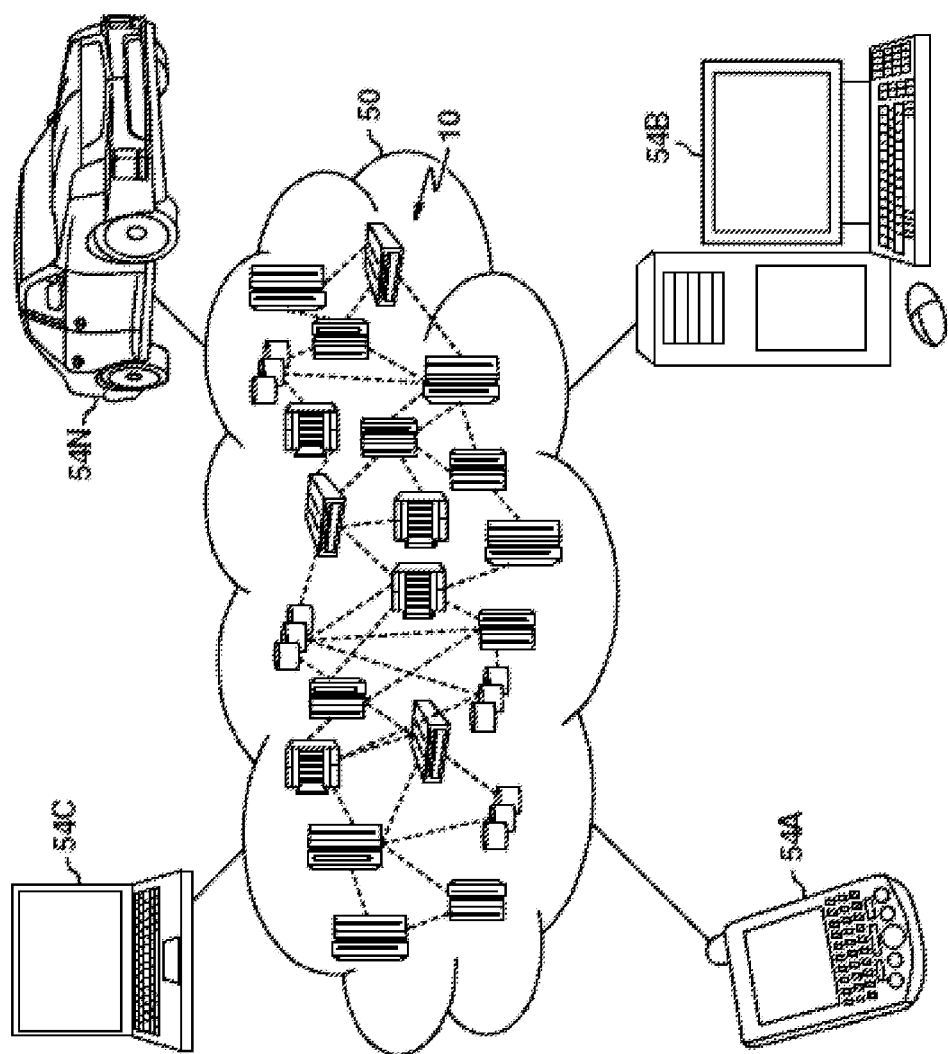
FIG. 1 depicts a cloud computing environment according to one or more embodiments described herein.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that, although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
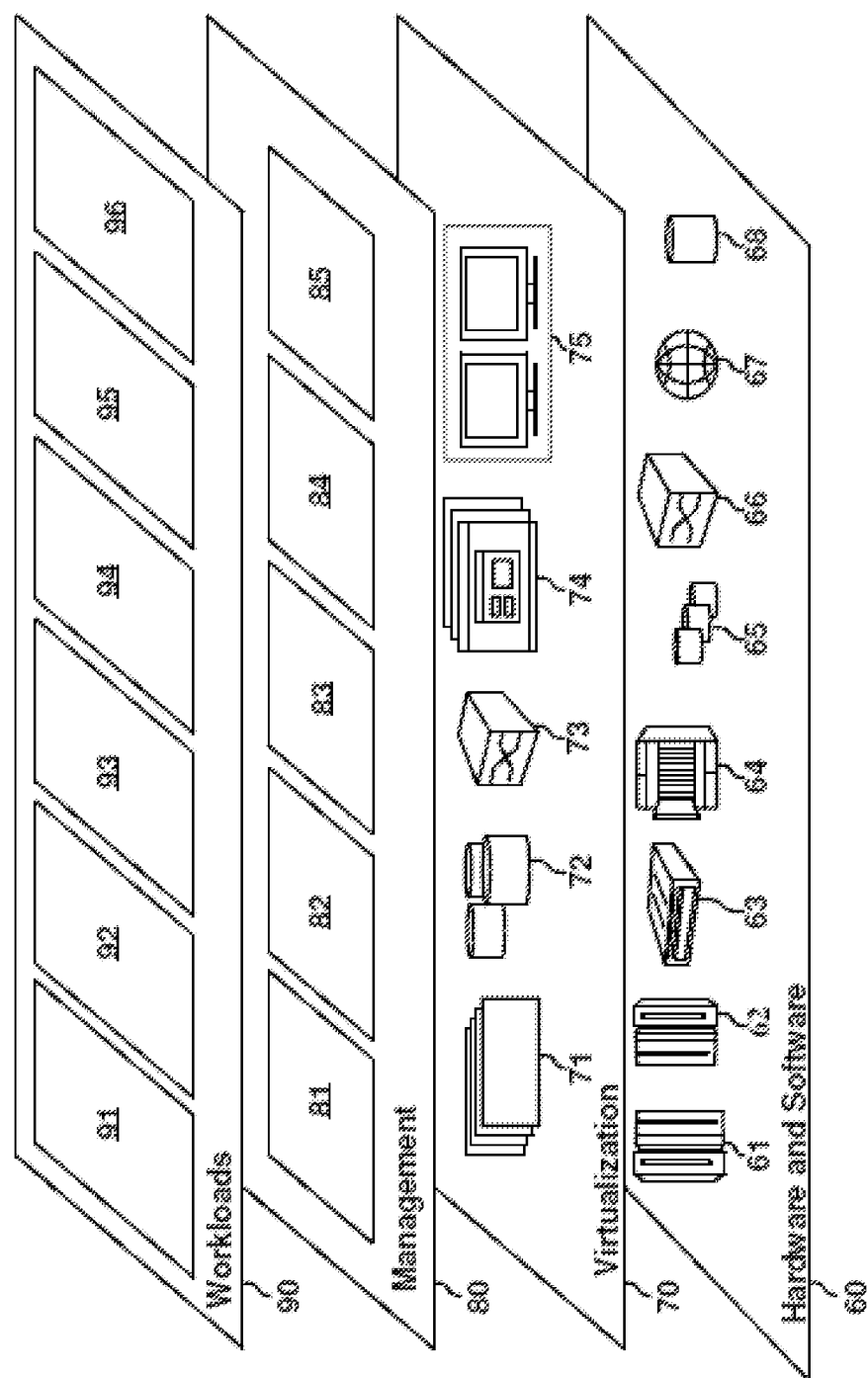
FIG. 2 depicts abstraction model layers according to one or more embodiments described herein.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and single use passcode authentication 96.

Figure 3:
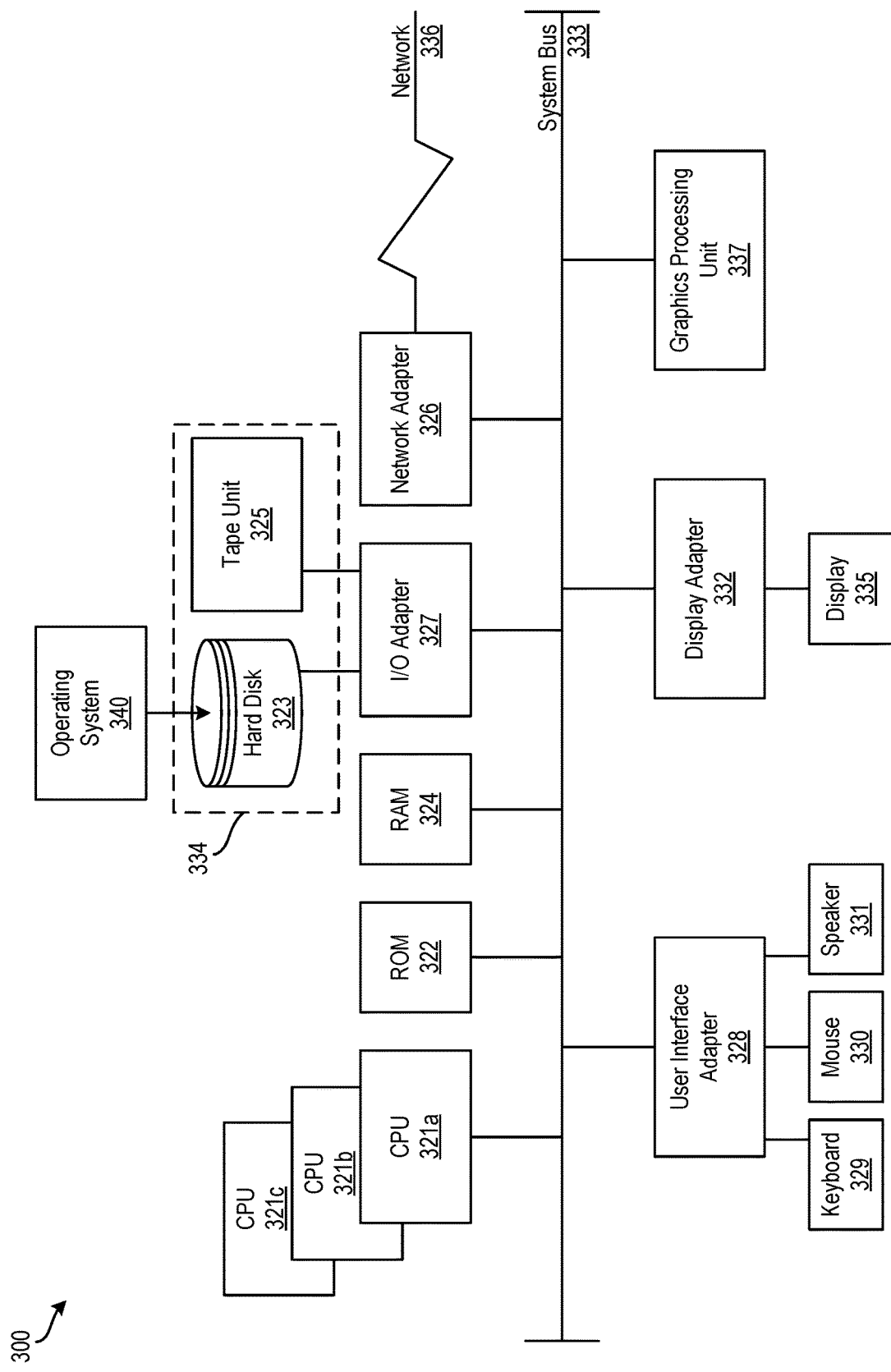
FIG. 3 depicts a block diagram of a processing system for implementing the presently described techniques according to one or more embodiments described herein.

It is understood that the present disclosure is capable of being implemented in conjunction with any other type of computing environment now known or later developed. For example, FIG. 3 depicts a block diagram of a processing system 300 for implementing the techniques described herein. In examples, processing system 300 has one or more central processing units (processors) 321a, 321b, 321c, etc. (collectively or generically referred to as processor(s) 321 and/or as processing device(s)). In aspects of the present disclosure, each processor 321 can include a reduced instruction set computer (RISC) microprocessor. Processors 321 are coupled to system memory (e.g., random access memory (RAM) 324) and various other components via a system bus 333. Read only memory (ROM) 322 is coupled to system bus 333 and may include a basic input/output system (BIOS), which controls certain basic functions of processing system 300.

Further depicted are an input/output (I/O) adapter 327 and a network adapter 326 coupled to system bus 333. I/O adapter 327 may be a small computer system interface (SCSI) adapter that communicates with a hard disk 323 and/or a tape storage drive 325 or any other similar component. I/O adapter 327, hard disk 323, and tape storage device 325 are collectively referred to herein as mass storage 334. Operating system 340 for execution on processing system 300 may be stored in mass storage 334. The network adapter 326 interconnects system bus 333 with an outside network 336 enabling processing system 300 to communicate with other such systems.

A display (e.g., a display monitor) 335 is connected to system bus 333 by display adapter 332, which may include a graphics adapter to improve the performance of graphics intensive applications and a video controller. In one aspect of the present disclosure, adapters 326, 327, and/or 332 may be connected to one or more I/O busses that are connected to system bus 333 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 333 via user interface adapter 328 and display adapter 332. A keyboard 329, mouse 330, and speaker 331 may be interconnected to system bus 333 via user interface adapter 328, which may include, for example, a Super I/O chip integrating multiple device adapters into a single integrated circuit.

In some aspects of the present disclosure, processing system 300 includes a graphics processing unit 337. Graphics processing unit 337 is a specialized electronic circuit designed to manipulate and alter memory to accelerate the creation of images in a frame buffer intended for output to a display. In general, graphics processing unit 337 is very efficient at manipulating computer graphics and image processing, and has a highly parallel structure that makes it more effective than general-purpose CPUs for algorithms where processing of large blocks of data is done in parallel.

Thus, as configured herein, processing system 300 includes processing capability in the form of processors 321, storage capability including system memory (e.g., RAM 324), and mass storage 334, input means such as keyboard 329 and mouse 330, and output capability including speaker 331 and display 335. In some aspects of the present disclosure, a portion of system memory (e.g., RAM 324) and mass storage 334 collectively store an operating system such as the AIX® operating system from IBM Corporation to coordinate the functions of the various components shown in processing system 300.

Turning now to an overview of technologies that are more specifically relevant to aspects of the invention, the technical solutions herein provide for single use passcode authentication using a single use authentication map to map a private set of characters to a public set of characters. Some existing applications utilize a passcode (e.g., a password, a "PIN," etc.) to enable a user to access a restricted resource. For example, a user enters his/her PIN into an application. If the PIN matches an expected PIN for that user, the user is granted access to the restricted resource. This approach typically involves transmitting the PIN between a user device associated with the user and a host or provider device associated with the application or resource provider. As one such example, a user device includes an electronic banking application, and the host device provides banking information to the user through the electronic banking application. Since banking information is often considered sensitive, it may be considered a restricted resource. Accordingly, in this example, the user enters his/her PIN (e.g., 5467), which can be created by or assigned to the user, and if the PIN matches an expected PIN for the user, the electronic banking application provides the banking information to the user.

Existing approaches typically involve encrypting a passcode, such as a PIN, that is sent between the user device and the host device to prevent unauthorized access, increase security, prevent "snooping" the passcode, etc. However, encryption algorithms can be broken. In addition, many passcodes, such as PINs, are short (e.g., 4 digits, 6 digits, etc.) and thus offer only limited security.

Turning now to an overview of the aspects of the invention, one or more embodiments of the invention address the above-described shortcomings of the prior art by providing improved security of processing systems. In particular, the present techniques improve the security of processing systems by implementing single use password authentication. A single use authentication map is generated; the single use authentication map maps a private set of characters (e.g., letters, numbers, etc.) to a public set of characters (e.g., letters, numbers, etc.). The public set of characters are visible and/or known to a user of a user device, while the private set of characters remain unknown or invisible to the user.

The single use authentication map is transmitted from the host device to the user device. The user device presents an authentication interface that includes the public set of characters (but not the private set of characters). In other words, the public set of characters is presented to the user. This enables the user to enter a user passcode using the public set of characters. The user device then encodes the user passcode into a single use passcode based at least in part on the single use authentication map.

The single use passcode is then received by the host device from the user device, and the host device decodes the single use passcode back to the user passcode using the single use authentication map. It can then be determined whether the user passcode matches an expected passcode, and thus a determination of whether to authorize access to a restricted resource can be made. It should be appreciated that the single use passcode changes each time an authorization attempt is made. That is, a new single use authentication map is generated and transmitted to the user device each time a login attempt is made.

The above-described aspects of the invention address the shortcomings of the prior art by improving the security of the user and host devices. For example, security is improved by changing the single use passcode with each login attempt. Moreover, this improves security by avoiding transmitting the user passcode over a network or other connection between the user and host devices. Moreover, the technical solutions described herein can provide secure transmission of a user passcode without the need for encryption.

Figure 4:
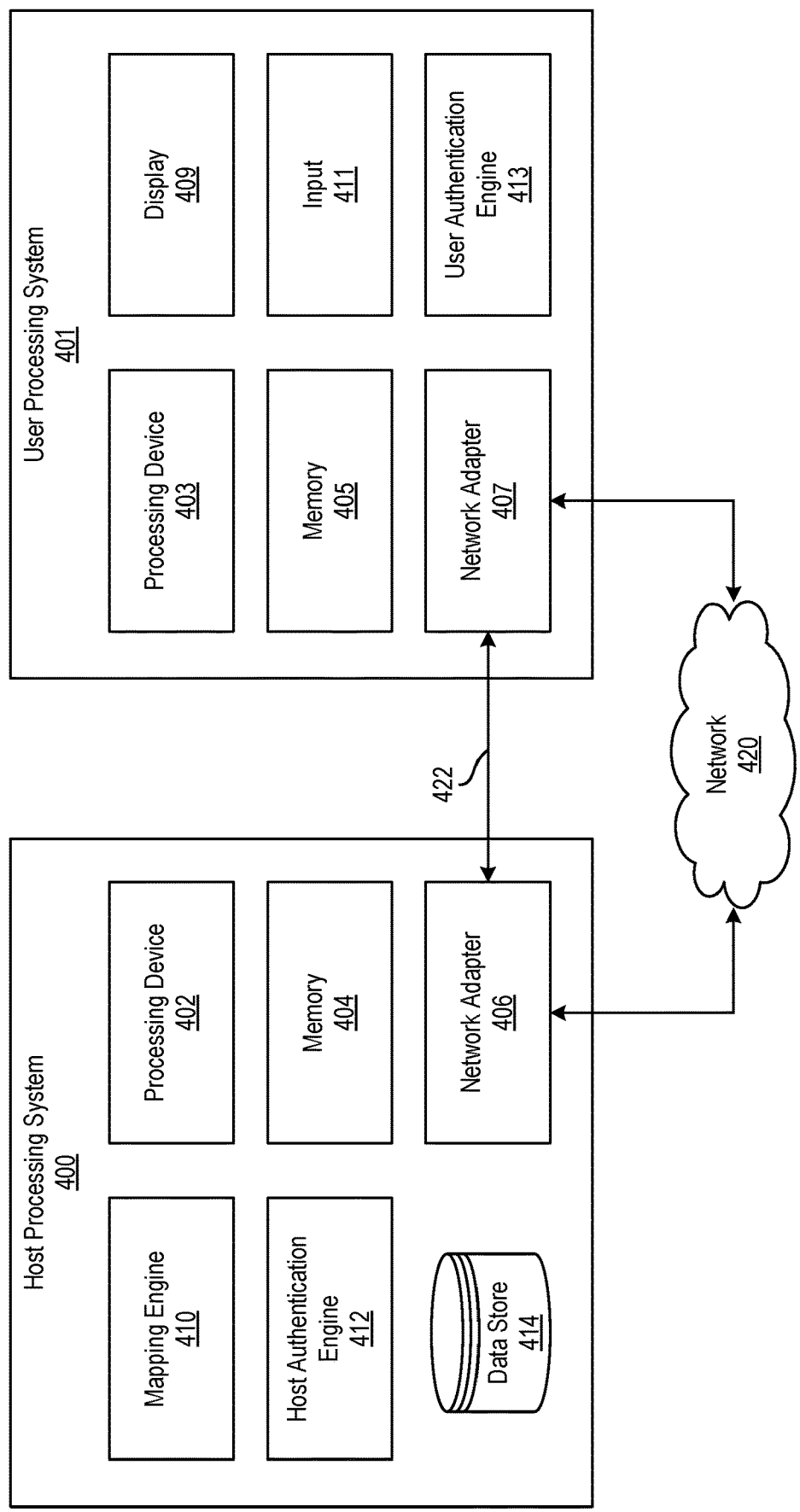
FIG. 4 depicts a block diagram of a host processing system and a user processing system for single use passcode authentication according to one or more embodiments described herein.

Turning now to a more detailed description of aspects of the present invention, FIG. 4 depicts a block diagram of a host processing system 400 and a user processing system 401 for single use passcode authentication according to one or more embodiments described herein. The host processing system 400 includes a processing device 402, a memory 404, a network adapter 406, a mapping engine 410, and a host authentication engine 412. The user processing system 401 includes a processing device 403, a memory 405, a network adapter 407, a display 409, an input 411, and a user authentication engine 413.

The various components, modules, engines, etc. described regarding FIG. 4 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include a processor (e.g., the processing device 402, the processing device 403, etc.) for executing those instructions. Thus a system memory (e.g., the memory 404, the memory 405, etc.) can store program instructions that when executed by the processing device 402 implement the engines described herein. Other engines can also be utilized to include other features and functionality described in other examples herein.

Figure 5:
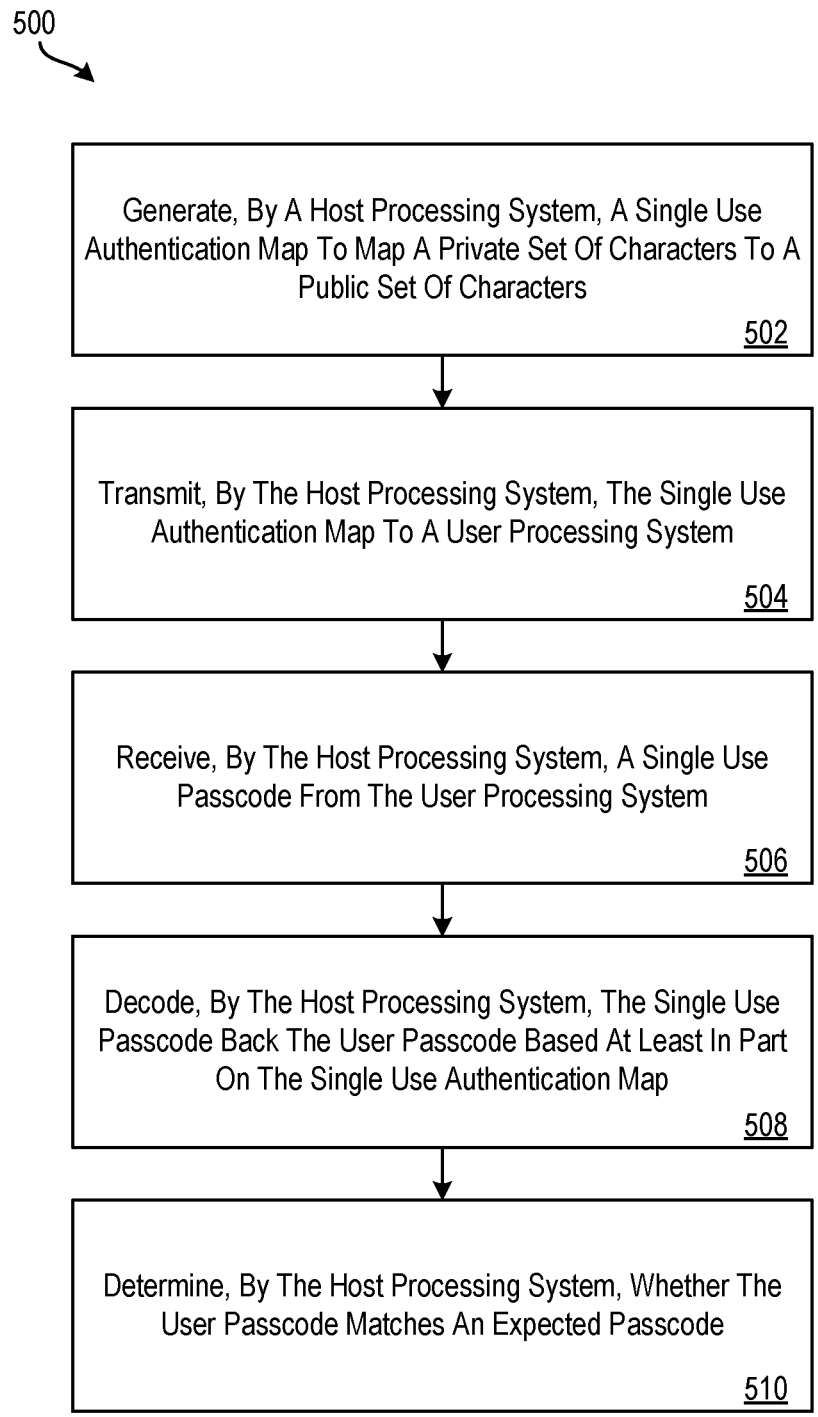
FIG. 5 depicts a flow diagram of a method for single use passcode authentication according to one or more embodiments described herein.

The features and functionality of the host processing system 400 and the user processing system 401 (and their respective components, modules, engines, etc.) are described in more detail with respect to FIG. 5. In particular, FIG. 5 depicts a flow diagram of a method 500 for single use passcode authentication according to one or more embodiments described herein. The method 500 can be implemented by any suitable processing system (e.g., the cloud computing environment 50, the processing system 300, the host processing system 400, the user processing system 401, etc.) or processing device (e.g., the processing device 321, the processing device 402, the processing device 403, etc.) and suitable combinations thereof.

At block 502, the mapping engine 410 of the host processing system 400 generates a single use authentication map to map a private set of characters to a public set of characters. FIGS. 6A, 6B, 6C, and 6D depict various examples of single use authentication maps 601, 602, 603, 604 according to one or more embodiments described herein. For example, FIG. 6A depicts a single use authentication map 601 having a private set of characters mapped to a public set of characters. In this example, "0" (private) is mapped to "8" (public), "1" (private) is mapped to "1" (public), "2" (private) is mapped to "7" (public), etc. FIG. 6B depicts a single use authentication map 602 having another private set of characters mapped to a public set of characters. In this example, "4" (private) is mapped to "0" (public), "9" (private) is mapped to "1" (public), "7" (private) is mapped to "2" (public), etc. In another example, FIG. 6C depicts a single use authentication map 603 having a private set of characters mapped to a public set of characters. In this example, "D" (private) is mapped to "0" (public), "A" (private) is mapped to "1" (public), "F" (private) is mapped to "2" (public), etc. FIG. 6D depicts yet another single use authentication map 604 having a private set of characters mapped to a public set of characters. In this example, "A" (private) is mapped to "F" (public), "B" (private) is mapped to "B" (public), "C" (private) is mapped to "D" (public), etc. It should be appreciated that FIGS. 6A-6D depict examples of single use authentication maps, and other examples are also possible.

The mapping engine 410 can use a random or pseudo-random number generator to generate the single use authentication map, for example. In another example, the mapping engine 410 selects a single use authentication map from a group of single use authentication maps that are stored in the data store 414. According to one or more embodiments described herein, the mapping engine 410 does not generate a single use authentication map that results in a single use passcode that matches the user passcode. This ensures that the actual user passcode is not transmitted from the user processing system 401 to the host processing system 400.

At block 504, the host processing system 400 transmits, using the network adapter 406 (e.g., the network adapter 326), the single use authentication map to the user processing system 401, which receives the single use authentication map using the network adapter 407 (e.g., the network adapter 326). It should be appreciated that the network adapters 406, 407 are any suitable network adapter or other communications adapter to enable the transmission and receipt of data, such as over a network 420 and/or via a direct link 422 between the network adapters 406, 407. The network 420 can be any suitable communication network, such as an intranet, the internet, a local area network, a wide area network, a wireless network, a peer-to-peer network, and the like, and suitable combinations thereof.

Figure 7A:
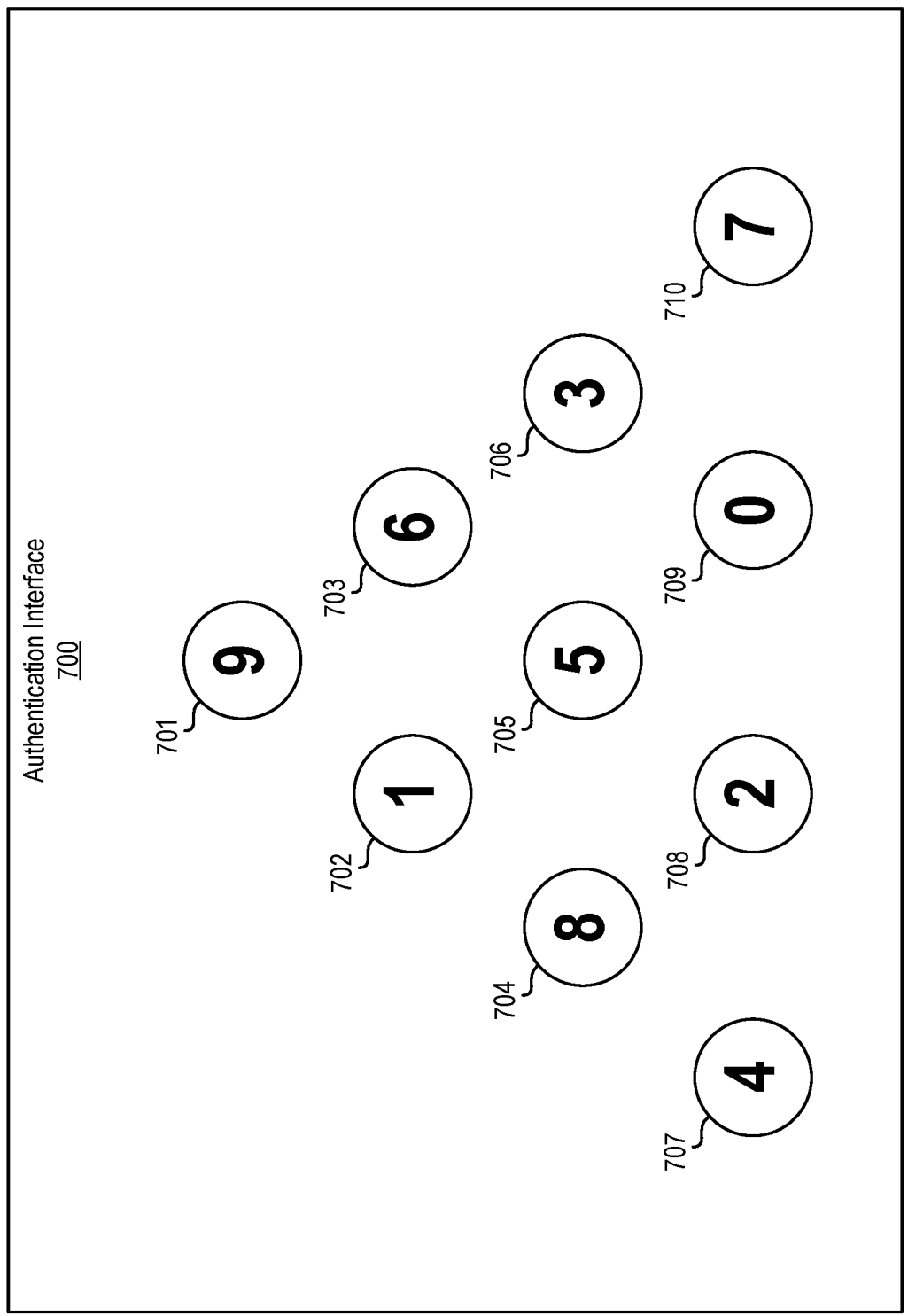
FIGS. 7A and 7B depict an example of an authentication interface for single use password authentication according to one or more embodiments described herein.

Once the user processing system 401 receives the single use authentication map, the user processing system 401 presents an authentication interface that includes the public set of characters to a user of the user processing system 401 to enable the user to enter a user passcode using the public set of characters. Examples of authentication interfaces are depicted in FIGS. 7A, 7B, 8A, and 8B. In particular, FIG. 7A depicts an example of an authentication interface 700. In this example, the authentication interface 700 includes the public set of characters arranged as shown. For this example, the authentication interface 700 includes ten inputs 701-710, and each input includes one of the characters of the public set of characters: input 701 includes public character 9, input 702 includes public character 1, input 703 includes public character 6, input 704 includes public character 8, input 705 includes public character 5, input 706 includes public character 3, input 707 includes public character 4, input 708 includes public character 2, input 709 includes public character 0, and input 710 includes public character 7. The authentication interface 700 is displayed on the display 409 of the user processing system 401. The display 409 can be any suitable display and can implement input capabilities (e.g., a touch screen) to enable the user to select one or more of the inputs 701-710, such as by tapping or touching the authentication interface 700.

Figure 7B:
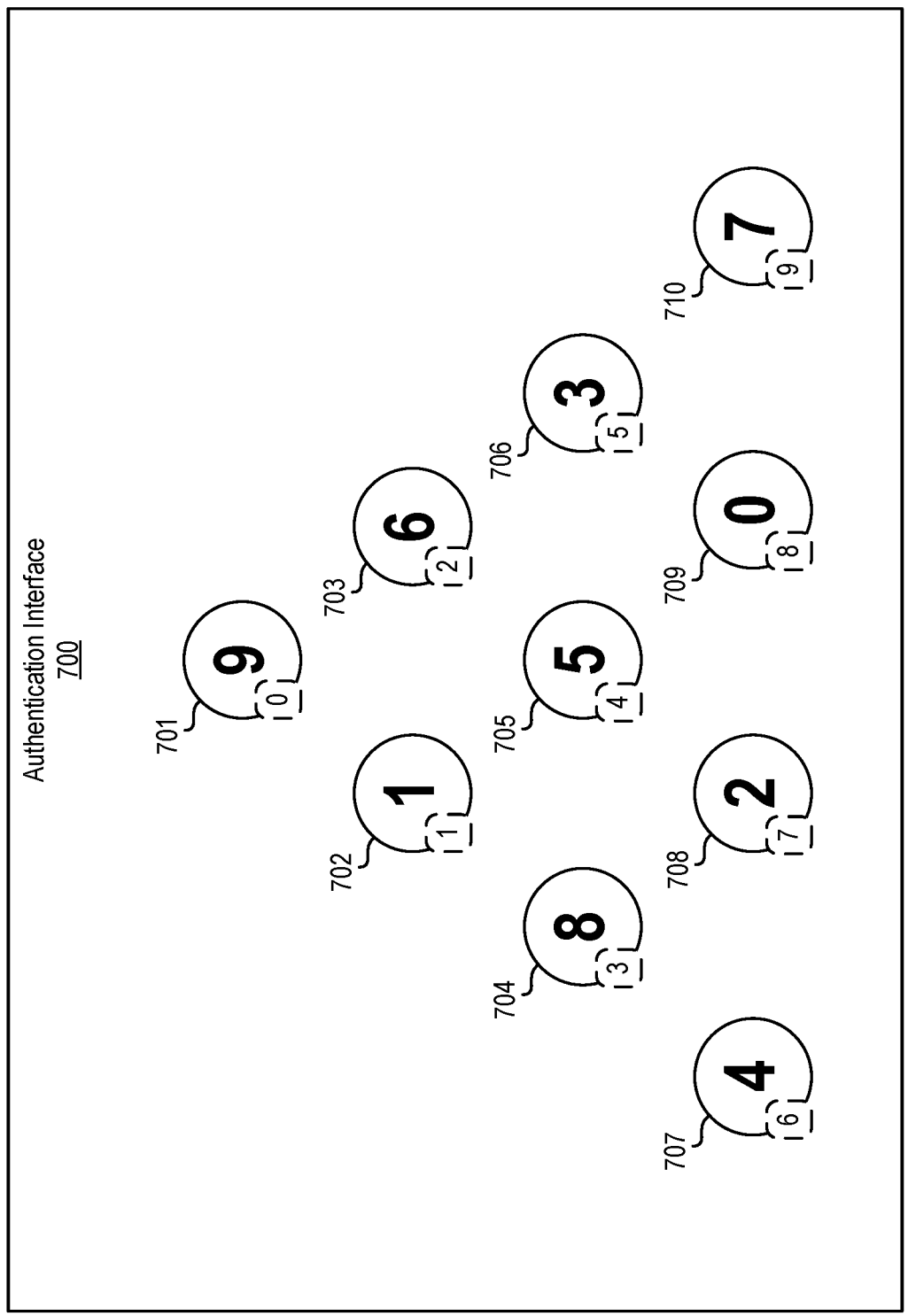

Each of the public inputs 701-710 has one of the characters of the private set of characters associated therewith. For example, as depicted in FIG. 7B, input 701 includes private character 0, input 702 includes private character 1, input 703 includes private character 2, input 704 includes private character 3, input 705 includes private character 4, input 706 includes private character 5, input 707 includes private character 6, input 708 includes private character 7, input 709 includes private character 8, and input 710 includes private character 9. The private characters are depicted in FIG. 7B inside dashed boxes associated with the inputs 701-710. It should be appreciated that the private characters are shown for example purposes only; the private characters are not displayed (or otherwise known) to a user of the user processing system 401.

With continued reference to block 504 of FIG. 5, the user is enabled to enter a user passcode using the authentication interface 700, such as using the input 411 of the user processing system 401. The user authentication engine 413 of the user processing system 401 encodes the user passcode into a single use passcode based at least in part on the single use authentication map. That is, the user authentication engine 413 converts the user passcode into a single use passcode using the single use authentication map. As an example in which the single use authentication map 601 of FIG. 6 is used, a user passcode entered as "5467" would be encoded into a single use passcode of "4629." That is, when the user enters an input of "5467" on the authentication interface 700 using the inputs 705, 707, 703, 710 respectively, the user authentication engine 413 encodes the user passcode of "5467" to a single use passcode of "4629."

At block 506, the host processing system 400 receives, via the network adapter 406, the single use passcode (e.g., "4629") from the user processing system 401.

At block 508, the host authentication engine 412 decodes the single use passcode back to the user passcode using the single use authentication map. Using the example described above based on the single use authentication map 601 of FIG. 6, the single use passcode "4629" is decoded and transformed back into the user passcode of "5467."

At block 510, the host authentication engine 412 of the host processing system 400 determines whether the user passcode matches an expected passcode. The expected passcode can be set by a user (such as during a signup or setup process), can be automatically assigned by the host processing system 400 or another entity/system, and the like. The expected passcode can be stored in a data store, such as the data store 414. When the user passcode is determined to match the expected passcode, the user processing system 401 can be authorized to access a restricted resource. However, when the user passcode is not determined to match the expected passcode, the user processing system 401 is denied access to the restricted resource.

If a subsequent authorization/authentication attempt is made (e.g., the user of the user processing system 401 attempts to authenticate again), a new single use authentication map is generated by the mapping engine 410 and transmitted to the user processing system 401. For example, if an authentication attempt is unsuccessful (e.g., the user passcode does not match the expected passcode), if a session times out, if a user logs off and wants to re-authenticate, etc., a new single use authentication map is generated. The new single use authentication map differs from initially-generated single user authentication map. For example, if the initially-generated single user authentication map (generated at block 502) is the single use authentication map 601, the new single use authentication map is the single use authentication map 602 of FIG. 6.

Additional processes also may be included. According to one or more embodiments described herein, the mapping engine 410 can generate a group of single use authentication maps and can transmit them to the user processing system 401, such as when the user creates an account, creates the user passcode, installs an application on the user processing system 401, etc. Each of the group of single use authentication maps can include a unique identifier. When the user attempts to authenticate, one of the unique identifiers can be sent from the host processing system 400 to the user processing system 401, and the user authentication engine 413 uses the unique identifier to select the corresponding single use authentication map to use to encode the user passcode into a single use passcode. The host authentication engine 412 uses the unique identifier to select the same single use authentication map to decode the single use passcode into the user passcode. Additionally, the unique identifiers can be stored in an ordered list known to both the host processing system 400 and the user processing system 401 such that the unique identifiers need not be sent each time an authentication attempt occurs. Rather, in this example, each of the host processing system 400 and the user processing system 401 use the next unique identifier in the list to select a corresponding single use authentication map for encoding/decoding the single use passcode. It should be understood that the process depicted in FIG. 5 represents an illustration, and that other processes may be added or existing processes may be removed, modified, or rearranged without departing from the scope and spirit of the present disclosure.

Figure 8A:
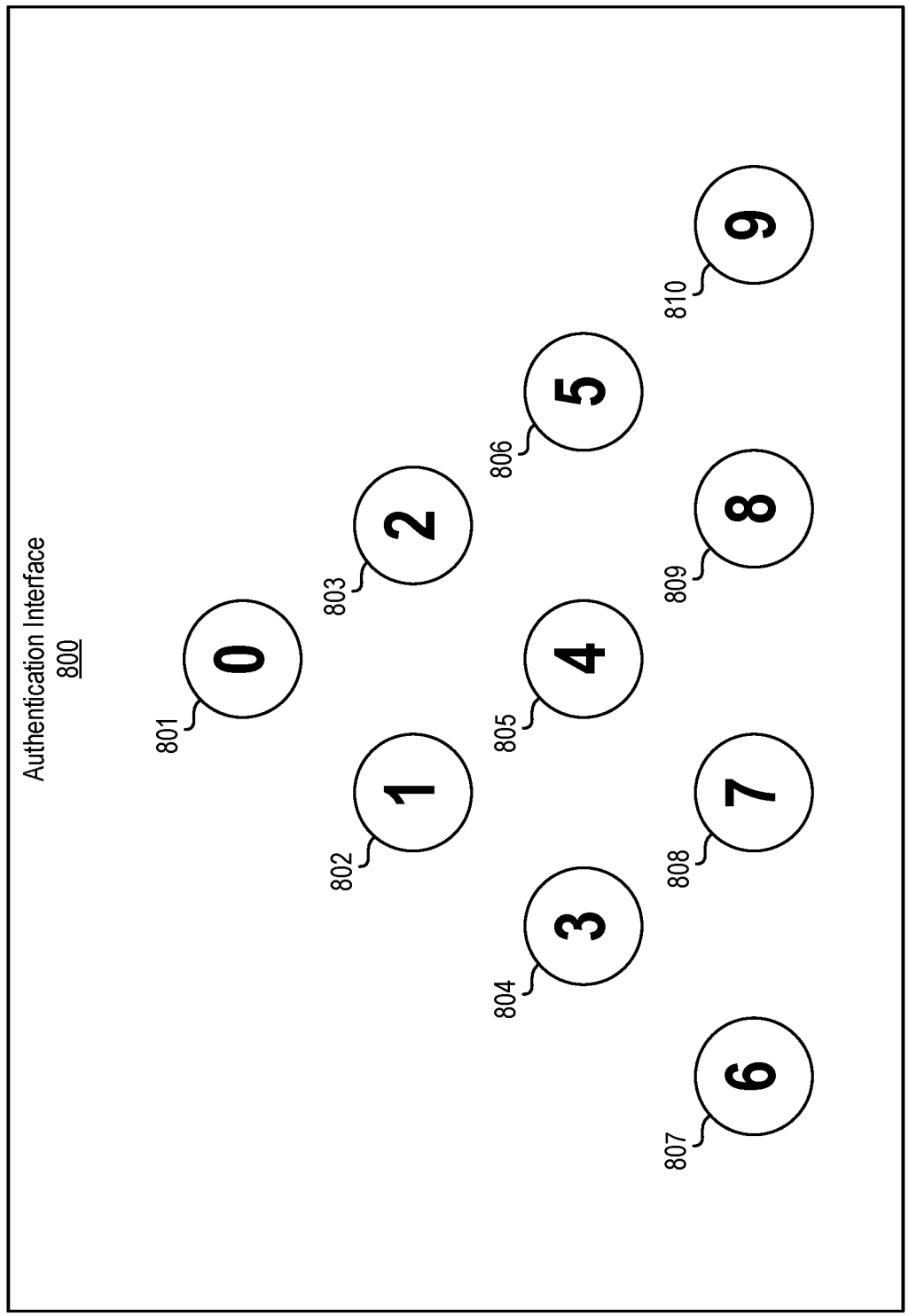
FIGS. 8A and 8B depict an example of an authentication interface for single use password authentication according to one or more embodiments described herein.
Figure 8B:
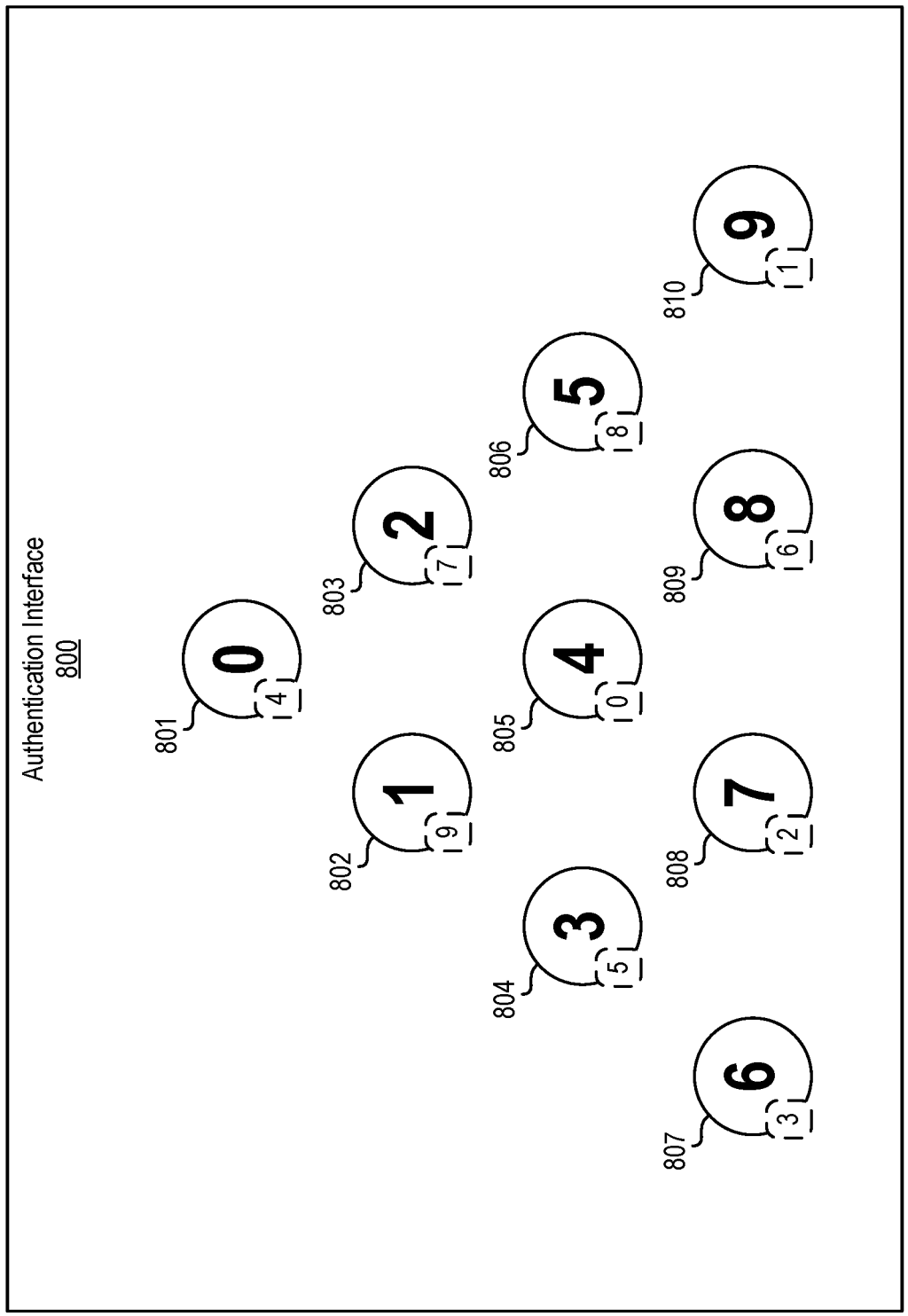

FIGS. 8A and 8B depict another example of an authentication interface 800 for single use password authentication according to one or more embodiments described herein. In this example, the authentication interface 800 includes the public set of characters arranged as shown. For this example, the authentication interface 800 includes ten inputs 801-810, and each input includes one of the characters of the public set of characters: input 801 includes public character 0, input 802 includes public character 1, input 803 includes public character 2, input 804 includes public character 3, input 805 includes public character 4, input 806 includes public character 5, input 807 includes public character 6, input 808 includes public character 7, input 809 includes public character 8, and input 810 includes public character 9. The authentication interface 800 is displayed on the display 409 of the user processing system 401. The display 409 can be any suitable display and can implement input capabilities (e.g., a touch screen) to enable the user to select one or more of the inputs 801-810, such as by tapping or touching the authentication interface 800.

Each of the public inputs 801-810 has one of the characters of the private set of characters associated therewith. For example, as depicted in FIG. 8B, input 801 includes private character 4, input 802 includes private character 9, input 803 includes private character 7, input 804 includes private character 5, input 805 includes private character 0, input 806 includes private character 8, input 807 includes private character 3, input 808 includes private character 2, input 809 includes private character 6, and input 810 includes private character 1. The private characters are depicted in FIG. 8B inside dashed boxes associated with the inputs 801-810. It should be appreciated that the private characters are shown for example purposes only; the private characters are not displayed (or otherwise known) to a user of the user processing system 401.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for single use passcode authentication, the method comprising:
   generating, by a host processing system, a single use authentication map to map a private set of characters to a public set of characters;
   transmitting, by the host processing system, the single use authentication map to a user processing system, the user processing system presenting an authentication interface comprising the public set of characters to a user to enable the user to enter a user passcode using the public set of characters, the user processing system encoding the user passcode into a single use passcode based at least in part on the single use authentication map;
   receiving, by the host processing system, the single use passcode from the user processing system;
   decoding, by the host processing system, the single use passcode back into the user passcode based at least in part on the single use authentication map;
   determining, by the host processing system, whether the user passcode matches an expected passcode; and
   responsive to determining that the user passcode does not match the expected passcode, generating, by the host processing system, a second single use authentication map to map a second private set of characters to the public set of characters, the second single use authentication map differing from the single use authentication map.

2. The computer-implemented method of claim 1 further comprising, responsive to determining that the user passcode matches the expected passcode, authorizing, by the host processing system, the user processing system to access a restricted resource.

3. The computer-implemented method of claim 1 further comprising, responsive to determining that the user passcode does not match the expected passcode, denying the user processing system access to a restricted resource.

4. The computer-implemented method of claim 1 further comprising, responsive to determining that the user passcode matches the expected passcode, generating, by the host processing system, a second single use authentication map to map a second private set of characters to the public set of characters, the second single use authentication map differing from the single use authentication map.

5. The computer-implemented method of claim 1 further comprising:
   transmitting, by the host processing system, the second single use authentication map to the user processing system, the user processing system presenting the authentication interface comprising the public set of characters to the user to enable the user to enter the user passcode using the public set of characters, the user processing system encoding the user passcode into a second single use passcode based at least in part on the second single use authentication map;

receiving, by the host processing system, the second single use passcode from the user processing system;

decoding, by the host processing system, the second single use passcode back the user passcode based at least in part on the second single use authentication map; and determining, by the host processing system, whether the user passcode matches the expected passcode.

6. The computer-implemented method of claim 1, wherein the private set of characters is a first set of numbers, and wherein the public set of characters is a second set of numbers.

7. The computer-implemented method of claim 1, wherein the private set of characters is a set of numbers, and wherein the public set of characters is a set of letters.

8. The computer-implemented method of claim 1, wherein the private set of characters is a first set of letters, and wherein the public set of characters is a second set of letters.

9. The computer-implemented method of claim 1, wherein at least one character of the private set of characters differs from at least one character of the public set of characters.

10. A system comprising:
a memory comprising computer readable instructions; and
a processing device for executing the computer readable instructions for performing a method for single use passcode authentication, the method comprising:
generating, by a host processing system, a single use authentication map to map a private set of characters to a public set of characters;
transmitting, by the host processing system, the single use authentication map to a user processing system, the user processing system presenting an authentication interface comprising the public set of characters to a user to enable the user to enter a user passcode using the public set of characters, the user processing system encoding the user passcode into a single use passcode based at least in part on the single use authentication map;
receiving, by the host processing system, the single use passcode from the user processing system;
decoding, by the host processing system, the single use passcode back into the user passcode based at least in part on the single use authentication map;
determining, by the host processing system, whether the user passcode matches an expected passcode; and
responsive to determining that the user passcode does not match the expected passcode, generating, by the host processing system, a second single use authentication map to map a second private set of characters to the public set of characters, the second single use authentication map differing from the single use authentication map.

11. The system of claim 10, wherein the method further comprises, responsive to determining that the user passcode matches the expected passcode, authorizing, by the host processing system, the user processing system to access a restricted resource.

12. The system of claim 10, wherein the method further comprises, responsive to determining that the user passcode does not match the expected passcode, denying the user processing system access to a restricted resource.

13. The system of claim 10, wherein the method further comprises, responsive to determining that the user passcode matches the expected passcode, generating, by the host processing system, a second single use authentication map to map a second private set of characters to the public set of characters, the second single use authentication map differing from the single use authentication map.

14. The system of claim 10, wherein the method further comprises:
transmitting, by the host processing system, the second single use authentication map to the user processing system, the user processing system presenting the authentication interface comprising the public set of characters to the user to enable the user to enter the user passcode using the public set of characters, the user processing system encoding the user passcode into a second single use passcode based at least in part on the second single use authentication map;
receiving, by the host processing system, the second single use passcode from the user processing system;
decoding, by the host processing system, the second single use passcode back the user passcode based at least in part on the second single use authentication map; and
determining, by the host processing system, whether the user passcode matches the expected passcode.

15. The system of claim 10, wherein the private set of characters is a first set of numbers, and wherein the public set of characters is a second set of numbers.

16. The system of claim 10, wherein the private set of characters is a set of numbers, and wherein the public set of characters is a set of letters.

17. The system of claim 10, wherein the private set of characters is a first set of letters, and wherein the public set of characters is a second set of letters.

18. A computer program product comprising:
a computer readable storage medium having program instructions embodied therewith, the program instructions executable by a processing device to cause the processing device to perform a method for single use passcode authentication, the method comprising:
generating, by a host processing system, a single use authentication map to map a private set of characters to a public set of characters;
transmitting, by the host processing system, the single use authentication map to a user processing system, the user processing system presenting an authentication interface comprising the public set of characters to a user to enable the user to enter a user passcode using the public set of characters, the user processing system encoding the user passcode into a single use passcode based at least in part on the single use authentication map;
receiving, by the host processing system, the single use passcode from the user processing system;
decoding, by the host processing system, the single use passcode back into the user passcode based at least in part on the single use authentication map;
determining, by the host processing system, whether the user passcode matches an expected passcode; and
responsive to determining that the user passcode does not match the expected passcode, generating, by the host processing system, a second single use authentication map to map a second private set of characters to the public set of characters, the second single use authentication map differing from the single use authentication map.

* * * * *